United States Patent [19]

von der Crone

[11] Patent Number: 4,966,930
[45] Date of Patent: Oct. 30, 1990

[54] PROCESS FOR COLORING HIGH MOLECULAR WEIGHT ORGANIC MATERIAL WITH PIGMENTS BASED ON IMINOISOINDOLINE

[75] Inventor: Jost von der Crone, Arconciel, Switzerland

[73] Assignee: Ciba-Geigy Corporation, Ardsley, N.Y.

[21] Appl. No.: 214,069

[22] Filed: Jul. 1, 1988

[30] Foreign Application Priority Data

Jul. 9, 1987 [CH] Switzerland .......................... 2617/87

[51] Int. Cl.$^5$ .......................... C08K 5/46; C08K 5/37; C08K 5/34
[52] U.S. Cl. ....................... 524/83; 524/92; 524/94
[58] Field of Search .............................. 524/83, 92, 94

[56] References Cited

U.S. PATENT DOCUMENTS 4,022,770  5/1977  L'Eplattenier et al. .
4,132,708  1/1979  L'Eplattenier et al. ............ 548/402
4,719,300  1/1988  Lotsch ................................ 524/92

FOREIGN PATENT DOCUMENTS 2142245  3/1973  Fed. Rep. of Germany .

OTHER PUBLICATIONS

Derwent DT 14611u-AEF.

Primary Examiner—Lewis T. Jacobs
Attorney, Agent, or Firm—Stephen V. O'Brien

[57] ABSTRACT

A process for coloring high molecular organic material, which comprises the use of isoindolines of formula I

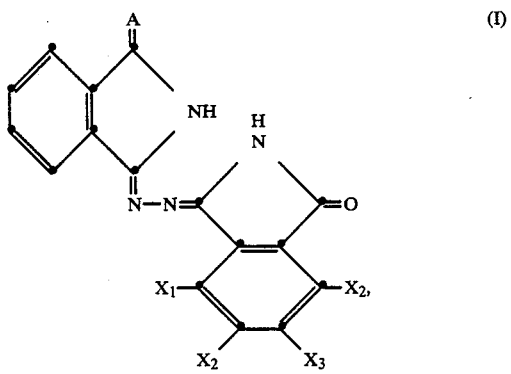 (I)

wherein A is a group of formula

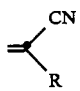

wherein R is a group selected from —CONHR$_1$, —COOR$_2$ and

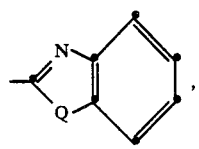

and R$_1$ is hydrogen, C hd 1-C$_4$alkyl, phenyl or phenyl which is substituted by one or more identical or different members of the group consisting of halogen, C$_1$-C$_4$alkyl, C$_1$-C$_4$ alkoxy, —COR$_3$, —NHCOR$_4$ or

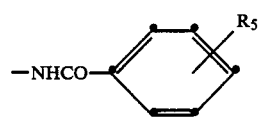

in which formulae R$_3$ is C$_1$-C$_4$alkoxy, —NH$_2$ or —NHR$_4$,
R$_4$ is C$_1$-C$_4$alkyl and
R$_5$ is hydrogen, halogen or C$_1$-C$_4$alkyl, and
R$_2$ is C$_1$-C$_4$alkyl and Q is —NH or —S—;
or A is a group of formula

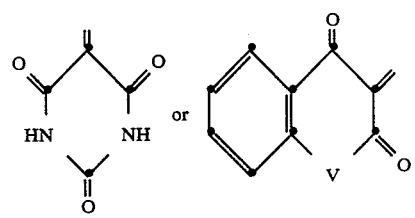

wherein V is NH or O,
X$_1$ and X$_3$ are each independently of the other halogen, C$_1$-C$_4$alkoxy, C$_1$-C$_4$alkylmercapto, or phenoxy or phenylmercapto, each unsubstituted or substituted by halogen, C hd 1-C$_4$alkyl or C$_1$-C$_4$alkoxy, and X$_2$ is halogen.

The strong colorations obtained by this process are distinguished in particular by good fastness to migration, heat, light and weathering.

5 Claims, No Drawings

PROCESS FOR COLORING HIGH MOLECULAR WEIGHT ORGANIC MATERIAL WITH PIGMENTS BASED ON IMINOISOINDOLINE

The present invention relates to a process for colouring high molecular organic material with pigments based on iminoisoindoline and 4,5,6,7-tetrasubstituted 1-hydrazinoisoindol-3-one.

Colourants based on iminoisoindoline and substituted 1-hydrazinoisoindol-3-one are disclosed in German Offenlegungsschrift No. 2 142 245. Although it is claimed in this publication that, depending on their solubility, these colourants are suitable for use as disperse dyes or pigment dyes, their use as pigments does not fully meet present day requirements of technology.

Reaction products of iminoisoindolines with 4,5,6,7-tetrasubstituted 1-hydrazinoisoindol-3-one are disclosed in German Offenlegungsschrift No. 2 504 321 as starting materials (ligands) for the preparation of metal complex pigments.

It has now been found that specific reaction products of iminoisoindolines with 4,5,6,7-tetrasubstituted 1-hydrazinoisoindol-3-one can be used as pigments having very good properties.

Accordingly, the present invention relates to a process for colouring high molecular organic material, which comprises the use of isoindolines of formula I

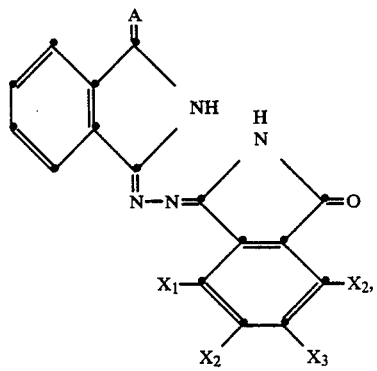

(I)

wherein A is a group of formula

wherein R is a group selected from —CONHR$_1$, —COOR$_2$ and

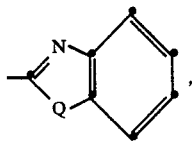

and R$_1$ is hydrogen, C$_1$–C$_4$alkyl, phenyl or phenyl which is substituted by one or more identical or different members of the group consisting of halogen, C$_1$–C$_4$alkyl, C$_1$–C$_4$alkoxy, —COR$_3$, —NHCOR$_4$ or

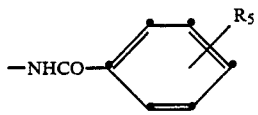

in which formulae R$_3$ is C$_1$–C$_4$alkoxy, —NH$_2$ or —NHR$_4$,
R$_4$ is C$_1$–C$_4$alkyl and
R$_5$ is hydrogen, halogen or C$_1$–C$_4$alkyl, and
R$_2$ is C$_1$–C$_4$alkyl and Q is —NH or —S—; or A is a group of formula

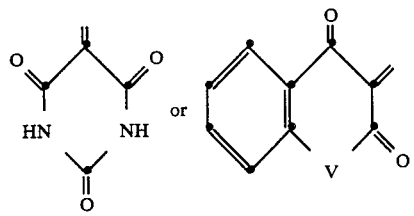

wherein V is NH or O,

X$_1$ and X$_3$ are each independently of the other halogen, C$_1$–C$_4$alkoxy,

C$_1$–C$_4$alkylmercapto, or phenoxy or phenylmercapto, each unsubstituted or substituted by halogen, C$_1$–C$_4$alkyl or C$_1$–C$_4$alkoxy, and X$_2$ is halogen.

Substituents defined as C$_1$–C$_4$alkyl may be methyl, ethyl, n-propyl, isopropyl, n-butyl, sec-butyl or tert-butyl.

Substituents defined as C$_1$–C$_4$alkoxy may be methoxy, ethoxy, n-propoxy, isopropoxy, n-butoxy, sec-butoxy or tert-butoxy.

Halogen is, for example, bromine, fluorine and, preferably, chlorine.

X$_1$ and X$_3$ as C$_1$–C$_4$alkylmercapto are, for example, methylmercapto, ethylmercapto, n-propylmercapto, isopropylmercapto, n-butylmercapto, sec-butylmercapto or tert-butylmercapto.

Of particular interest is the use of isoindolines of formula I, wherein X$_1$, X$_2$ and X$_3$ are chlorine and A has the meaning given above.

It is preferred to use isoindolines of formula I, wherein A is a group of formula

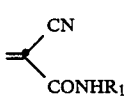

wherein R$_1$ is hydrogen, C$_1$–C$_4$alkyl, phenyl or phenyl which is substituted by one or more identical or different members selected from the group consisting of chlorine, C$_1$–C$_4$alkyl, C$_1$–C$_4$alkoxy, methoxycarbonyl, benzoylamino and p-chlorobenzoylamino, and X$_1$, X$_2$ and X$_3$ are chlorine.

It is also preferred to use isoindolines of formula I, wherein A is a group of formula

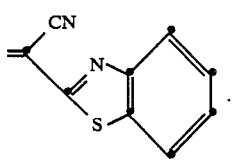

It is particularly preferred to use isoindolines of formula I, wherein A is a group of formula

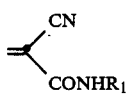

wherein $R_1$ is hydrogen, phenyl or phenyl which is substituted by chlorine or methoxy, and $X_1$, $X_2$ and $X_3$ are chlorine.

The isoindolines of formula I are compounds which are known per se. Any compounds that may be novel can be prepared by methods analogous to the commonly known ones disclosed, for example, in German Offenlegungsschrift No. 2 504 321:

(a) by condensing a compound of formula II

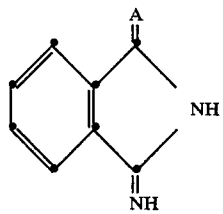
(II)

with a hydrazone of formula III

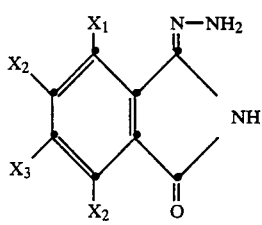
(III)

or (b) by condensing a hydrazone of formula IV

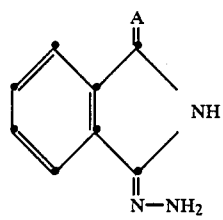
(IV)

with a compound of formula V

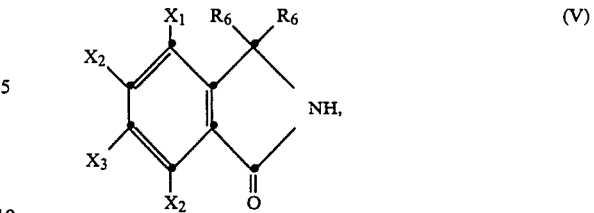
(V)

wherein $R_6$ is $C_1-C_6$alkoxy, halogen or $-NH_2$, or (c) condensing a compound of formula VI

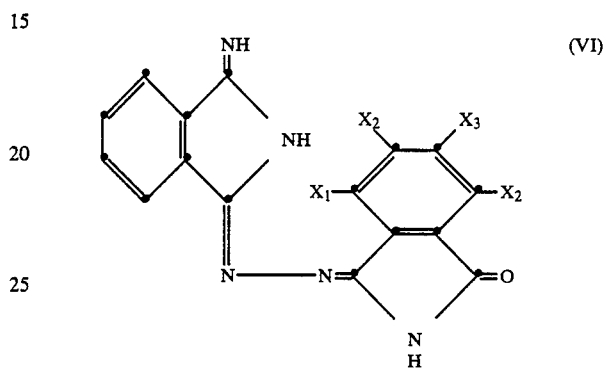
(VI)

with a compound of formula VII

$AH_2$ (VII), in which formulae II to VII above the substituents A, $X_1$, $X_2$ and $X_3$ are as defined above.

The compounds of formulae II, III, IV, V, VI and VII are known compounds.

The isoindolines of this invention obtained by the above described methods are usually formed at elevated temperature and can be isolated in pure form by filtration and, if desired, by washing with organic solvents.

The eligible isoindolines of formula I are valuable pigments which have, in general, a good texture and can normally be used as untreated products. If necessary or desired, the untreated products can be converted by grinding or kneading into a finely dispersed form. This is conveniently done by using grinding assistants such as glass, plastic, steel or metal grinding elements, inorganic or organic salts or both, in the presence or absence of organic solvents. After the grinding operation, assistants are removed in conventional manner: soluble inorganic salts, for example, with water, and water-insoluble assistants, for example, by stream distillation. It is often possible to achieve an enhancement of the pigment properties by treating the crude pigments with organic solvents.

Examples of high molecular organic materials which may be coloured or pigmented with the isoindolines of formula I are cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

Also suitable are high molecular organic materials in dissolved form as film formers, e.g. boiled linseed oil, nitrocellulose, alkyd resins, phenolic resins, melamine resins, acrylic resins and urea/formaldehyde resins.

The above high molecular compounds may be singly or as mixtures in the form of plastics, melts or of spinning solutions, varnishes, paints or printing inks. Depending on the end use, it is advantageous to use the isoindolines of formula I as toners or in the form of preparations. The isoindolines of formula I are preferably employed in an amount of 0.01 to 30% by weight, preferably 0.1 to 10% by weight, based on the high molecular organic material to be pigmented.

The pigmenting of the high molecular organic compounds with the isoindolines of formula I is carried out for example by incorporating such an isoindoline, if appropriate in the form of a masterbatch, into the substrates using roll mills, mixing or grinding machines. The pigmented material is then brought into the desired final form by methods which are known per se, for example calendering, moulding, extruding, coating, spinning, casting or by injection moulding. It is often desirable to incorporate plasticisers into the high molecular compounds before processing in order to produce non-brittle mouldings or to diminish their brittleness. Suitable plasticisers are for example esters of phosphoric acid, phthalic acid or sebacic acid. The plasticisers may be incorporated before or after working the isoindolines into the polymers. To obtain different shades, it is also possible to add fillers or other chromophoric components such as white, coloured or black pigments, in any amount, to the high molecular organic compounds, in addition to the isoindolines of this invention.

For pigmenting varnishes and printing inks, the high molecular organic materials and the isoindolines of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The colourations obtained, for example in plastics, filaments, varnishes or prints, have good allround fastness properties such as good dispersibility, high transparency, good fastness to overspraying, migration, heat, light, and weathering.

The invention is illustrated by the following Examples.

EXAMPLE 1

With stirring, 4.32 g of 1-(cyanophenylcarbamoylmethylene)-3-iminoisoindoline and 4.5 g of 4,5,6,7-tetrachloroisoindolin-1-on-3-ylidene hydrazine are heated to reflux in 50 ml of glacial acetic acid. The viscous reaction mixture is diluted with 100 ml of o-dichlorobenzene and stirred for 3 hours at reflux temperature. The pigment is subsequently isolated by suction filtration at 100° C. The filter cake is washed with cold o-dichlorobenzene and then with methanol and dried, affording 7.25 g of the isoindoline of formula

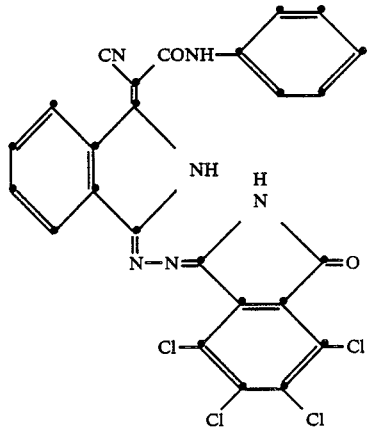

in the form of a yellow orange powder which, when incorporated in PVC and varnishes, gives strong, yellow colourations of good fastness to migration, heat and light.

EXAMPLES 2-14

The procedure of Example 1 is repeated, using appropriate starting materials, to give isoindolines of formula

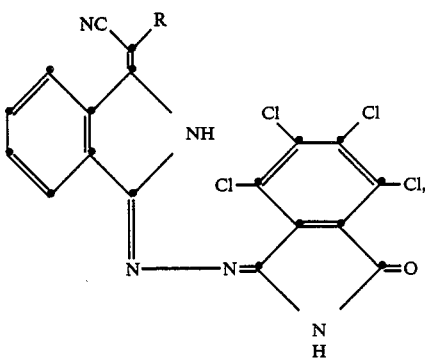

wherein R has the respective meanings given in Table 1. When incorporated in PVC, these pigments give strong colourations of good fastness properties in the shades indicated in Table I.

TABLE I

| Example | R | Shade in PVC (0.2% by weight of pigment based on PVC) |
| --- | --- | --- |
| 2 | —CONH$_2$ | medium yellow |
| 3 | —CONH—⟨phenyl-3,4-Cl$_2$⟩ | medium yellow |

TABLE I-continued

| Example | R | Shade in PVC (0.2% by weight of pigment based on PVC) |
|---|---|---|
| 4 | —CONH—C₆H₄—Cl | reddish yellow |
| 5 | —CONH—C₆H₄—COOCH₃ | medium yellow |
| 6 | —CONH—C₆H₄—OCH₃ | orange |
| 7 | —CONH—C₆H₄—CH₃ | orange |
| 8 | —CONH—C₆H₃(Cl)—NHCO—C₆H₄—Cl | reddish yellow |
| 9 | —CONH—C₆H₂(OC₂H₅)₂—NHCO—C₆H₅ | brown |
| 10 | —CONH—C₆H₄—Cl | reddish yellow |
| 11 | —COOCH₃ | medium yellow |
| 12 | 2-benzimidazolyl (NH) | red |
| 13 | —CONH—C₆H₃(Cl)(OCH₃) | orange |
| 14 | 2-benzothiazolyl | red |

EXAMPLE 15

With stirring, 3.22 g of 1-(cyano-4-chlorophenylcarbamoylmethylene)-3-imino-isoindoline and 2.9 g 4,6-dichloro-3,5-dimethoxyisoindolin-1-on-3-ylidene hydrazine are heated to reflux in 50 ml of glacial acetic acid. The viscous reaction mixture is diluted with 50 ml of o-dichlorobenzene and stirred for 4 hours at reflux temperature. The resultant pigment is isolated by filtration at 100° C., washed with cold o-dichlorobenzene and then with methanol and dried, affording 5.4 g of the isoindoline of formula

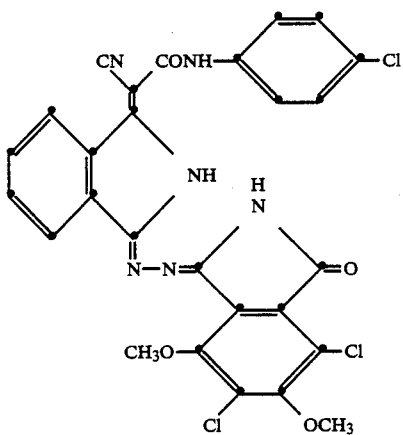

in the form of a yellow powder which, when incorporated in PVC and varnishes, gives strong yellow colourations of good fastness to migration, heat and light.

EXAMPLES 16 AND 17

The procedure of Example 15 is repeated, using appropriate starting materials, to give isoindolines of formula

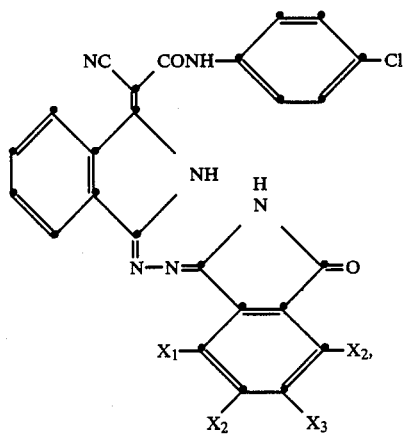

wherein $X_1$, $X_2$ and $X_3$ are as defined in Table II. When incorporated in PVC, these pigments give strong colourations of good fastness properties in the shades indicated in Table II.

TABLE II

| Example | $X_1$ | $X_2$ | $X_3$ | Shade in PVC (0.2% by weight of pigment, based on PVC) |
|---|---|---|---|---|
| 16 | —Cl | —Cl | —OCH₃ | medium yellow |
| 17 | —Cl | —Cl | —O—⌬ | medium yellow |

EXAMPLE 18

A mixture of 130 g of steatite balls having a diameter of 8 mm, 47.5 g of an alkyd/melamine stoving varnish consisting of 60 g of a short oil alkyd resin Beckosol ® 27-320 (Reichhold Chemie AG), 60% in xylene, 36 g of melamine resin Super-Beckamin ® 13-501 (Reichhold Chemie AG), 50% in a 2:1 mixture of xylene/butanol, 2 g of xylene and 2 g of ethylene glycol monomethyl ether, and 2.5 g of the isoindoline pigment obtained in Example 10 are dispersed in a 200 ml glass flask with twist-off cap for 120 hours on a roller gear bed. After separating the glass balls, 2.4 g of the dispersed full shade mixture are mixed with 6 g of titanium dioxide Kronos ® RN 59 (Kronos Titan GmbH) and a further 24.0 g of the alkyd/melamine stoving varnish. The coloured varnish solution is sprayed on to aluminium sheets and subsequently stoved for 30 minutes at 130° C. to give very strong reddish yellow finishes of excellent fastness properties.

EXAMPLE 19

40 mg of the isoindoline pigment obtained in Example 14, 7.3 ml of dioctyl phthalate and 13.3 g of stabilised polyvinyl chloride LONZA ® E 722 are thoroughly mixed in a glass beaker with a glass rod and the mixture is processed to a thin sheet on a roll mill for 5 minutes at 60° C. The PVC sheet so obtained is coloured in a very strong red shade which is fast to migration, weathering and light.

EXAMPLE 20

A mixture consisting of 1.0 g of the isoindoline pigment obtained in Example 2, 1.0 g of antioxidant (®IRGANOX 1010, Ciba-Geigy AG) and 1000 g of high density polyethylene granules (®Vestolen A 60-16, Chem. Werke Hüls) is stirred for 15 minutes in a glass flask on a roller gear table. The mixture is then extruded in two passes in a single screw extruder. The granulate so obtained is moulded to plates at 220° C. in an injection moulding machine (Allround Aarburg 200) and then post-formed for 5 minutes at 180° C. The mouldings are coloured in strong yellow shades of excellent fastness properties.

EXAMPLE 21

1000 g of polypropylene granules (®DAPLEN PT-55, Chemie Linz) and 20 g of a 50% pigment preparation consisting of 10 g of the isoindoline pigment obtained in Example 2 and 10 g of magnesium behenate are thoroughly mixed in a mixing drum. The granules so obtained are melt spun at 260°–285° C. to yellow filaments of good lightfastness and textile fibre properties.

I claim:
1. A composition comprising a high molecular weight organic material and an isoindoline of formula I

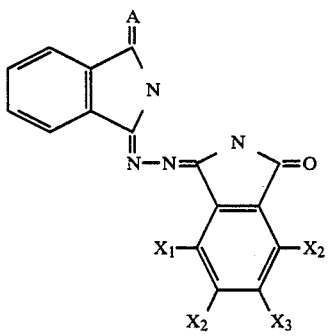

wherein A is a group of formula

wherein R is a group selected from —CONHR$_1$, —COOR$_2$ and

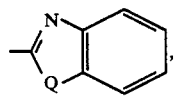

and

R$_1$ is hydrogen, C$_1$–C$_4$alkyl, phenyl or phenyl which is substituted by one or more identical or different members of the group consisting of halogen, C$_1$–C$_4$alkyl, C$_1$–C$_4$alkoxy, —COR$_3$, —NHCOR$_4$ and

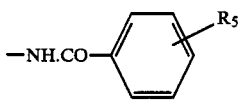

in which R$_3$ is C$_1$–C$_4$alkoxy, —NH$_2$ or —NHR$_4$,

R$_4$ is C$_1$–C$_4$alkyl and

R$_5$ is hydrogen, halogen or C$_1$–C$_4$alkyl, and

R$_2$ is C$_1$–C$_4$alkyl and Q is —NH or —S—; or A is a group of formula

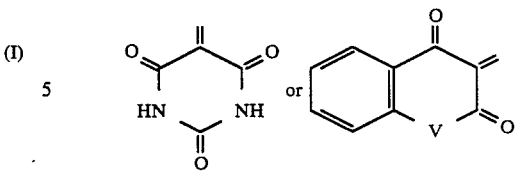 (I)

wherein V is NH or O,

X$_1$ and X$_3$ are each independently of the other halogen, C$_1$–C$_4$alkoxy, C$_1$–C$_4$alkylmercapto, or phenoxy or phenylmercapto, each unsubstituted or substituted by halogen, C$_1$–C$_4$alkyl, or C$_1$–C$_4$alkoxy, and X$_2$ is halogen, wherein the amount of the compound of formula I is 0.01 to 30 weight % based on the weight of the composition.

2. A composition according to claim 1, which comprises an isoindoline of the formula I, wherein X$_1$, X$_2$ and X$_3$ are chlorine and A is as defined in claim 1.

3. A composition according to claim 1, which comprises an isoindoline of the formula I, wherein A is a group of formula

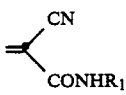

wherein R$_1$ is hydrogen, C$_1$–C$_4$alkyl, phenyl or phenyl which is substituted by one or more identical or different members selected from the group consisting of chlorine, C$_1$–C$_4$alkyl, C$_1$–C$_4$alkoxy, methoxycarbonyl, benzoylamino and p-chlorobenzoylamino, and X$_1$, X$_2$ and X$_3$ are chlorine.

4. A composition according to claim 1, which comprises an isoindoline of formula I, wherein A is a group of formula

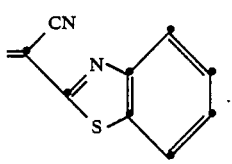

5. A composition according to claim 1, which comprises an isoindoline of formula I, wherein A is a group of formula

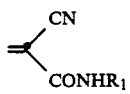

wherein R$_1$ is hydrogen, phenyl or phenyl which is substituted by chlorine or methoxy, and X$_1$, X$_2$ and X$_3$ are chlorine.

* * * * *